INVENTOR
JOSEPH FRANKS
BY [signature]
ATTORNEY

INVENTOR
JOSEPH FRANKS
BY [signature]
ATTORNEY

INVENTOR
JOSEPH FRANKS
BY [signature]
ATTORNEY

INVENTOR
JOSEPH FRANKS
BY [signature]
ATTORNEY

INVENTOR
JOSEPH FRANKS
BY [signature]
ATTORNEY

United States Patent Office 3,407,341

Patented Oct. 22, 1968

3,407,341

SEMICONDUCTOR DEVICE HAVING THE CHARACTERISTICS OF A DIGITAL SHIFT REGISTER

Joseph Franks, Harlow, Essex, England, assignor to International Standard Electric Corporation, New York, N.Y., a corporation of Delaware Filed Feb. 21, 1966, Ser. No. 528,963
Claims priority, application Great Britain, May 20, 1965, 21,346/65, 21,361/65
10 Claims. (Cl. 317—234)

ABSTRACT OF THE DISCLOSURE

This is a semiconductor device having a plurality of injection terminals on opposite faces of the device wherein said device can operate as a digital shift register. Pulses are injected into a first injection terminal on one face and a second injection terminal on the opposite face of the device and when a threshold voltage is exceeded, the resistance characteristics between these two terminals shifts from a high resistance state to a low resistance state. Then as a pulse is introduced across a third terminal the normally high resistance which exists between the second and third terminals will switch to a low resistance state, if the resistance characteristic between the first and second terminals is still in the low resistance state. This process is repeated with the succeeding terminals of the device as pluses are shifted from one end of the device to the other.

This invention relates to semiconductor devices and more particularly to a semiconductor device having a layer of semiconductor material and serial spaced injection contacts on each opposing face.

According to this invention there is provided a semiconductor device for transferring an electrical pulse from one end thereof to the other in successive stages comprising a layer of semiconductor material capable of exhibiting a double injection negative resistance effect two similar series of spaced injection contacts being respectively hole and electron injecting disposed on opposite faces of said layer the contacts of each series being connected each to an electrical terminal common to that series only by similar impedances, the connections, impedances and terminals being insulated from the semiconductor layer.

One embodiment of this invention relates to a digital shift register in which digital electrical impulses are transferred through successive stages in the register under the influence of applied clock pulse trains. The digital shift register includes a layer of semiconductor material capable of exhibiting a double injection negative resistance effect having on each face two series of spaced injection contacts arranged in an interdigital pattern, the contacts of each series being connected each to an electrical terminal common to that series only by similar impedances, the connections, impedances and terminals for each series being insulated from the semiconductor layer, the interdigital contact patterns on the two opposing faces being axially aligned with individual contacts of each pattern being opposite spaces in the opposite pattern, the contacts on one face being hole injecting contacts and the contacts on the other face being electron injecting contacts.

Another embodiment of this invention relates to a pulse store of the type in which a digital electrical pulse is inserted into one end of a sequence of storage locations and is transferred at a constant velocity through the storage locations until it is removed from the store at a fixed time after insertion. This type of store is analogous to a delay line store in which the rate of propagation of the information through the store is determined by the stored parameters and not by any external influence such as clock pulses. In this embodiment there is provided a pulse store including a layer of semiconductor material capable of exhibiting a double injection negative resistance effect having two similar series of spaced injection contacts being respectively hole and electron injecting, the contacts of each series being connected each to an electrical terminal common to that series only by similar impedances, the connections, impedances and terminals for each series being insulated from the semiconductor layer, the contacts of the two series being connected in successive pairs by similar capacitances.

In one variation of this embodiment the two series of contacts are arranged in axial alignment on opposite faces respectively of the semiconductor layer, the contacts of one series being opposite the contacts of the other series. In an alternative variation each face of the layer is provided with two series of contacts of hole or electron injecting types respectively which are arranged in an interdigital pattern, the interdigital patterns on the two opposing faces being axially aligned, the hole injecting contacts of one pattern being placed opposite the electron injecting contacts of the other pattern.

Preferably the contact patterns are of gold and aluminium respectively and are deposited as thin films on a semi-insulating gallium arsenide substrate. The impedances and electrical terminals are also preferably thin film metal patterns deposited on an insulating thin film on the gallium arsenide and making contact with the injection contacts.

The above and other features of the invention will become more readily apparent and be better understood from the following description in conjunction with the accompanying drawings in which.

Figure 1:
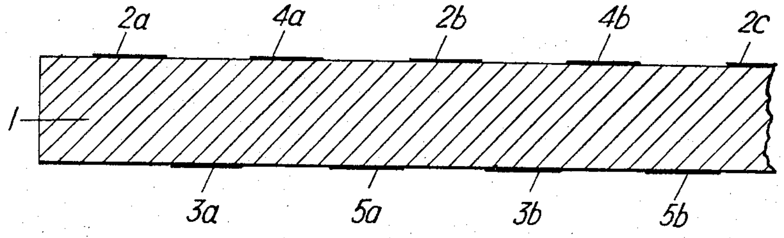
FIG. 1 is a cross-sectional view of a layer of gallium arsenide with a pattern of injection contacts on each face.

In the arrangement shown in FIG. 1 a thin slice 1 of semi-insulating gallium arsenide is provided on one face with two sets of gold contacts 2 and 4 and on the other face with two sets of aluminium contacts 3 and 5. Contacts *2a*, *2b*, *2c* etc. are each connected by an impedance (not shown) to a common electrical terminal. Contacts *4a*, *4b* etc. are similarly connected to a separate terminal as are the two sets of aluminium contacts *3a*, *3b* and *5a*, *5b* etc.

Figure 3:
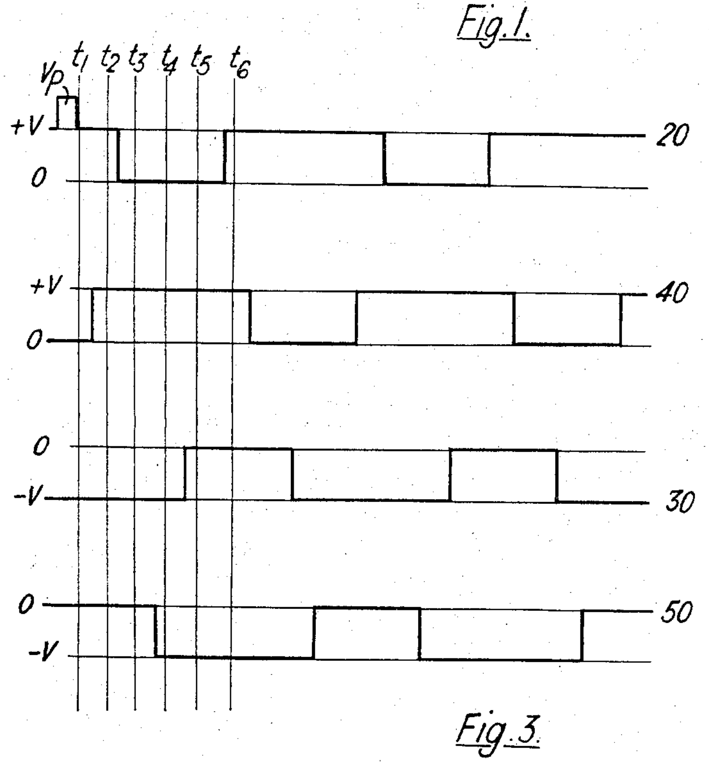
FIG. 3 illustrates a set of four clock pulse trains required to operate the arrangement of FIG. 1 as a digital shift register.
Figure 2:
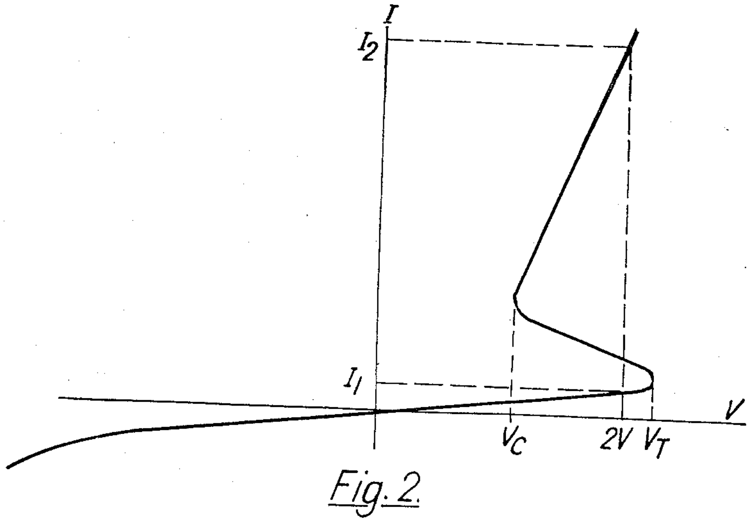
FIG. 2 illustrates a typical double injection negative resistance characteristic.

The double injection characteristic shown in FIG. 2 is obtained in the following manner. A bias voltage 2 v. is applied between contacts *2a* and *3a*. This is conveniently achieved by supplying suitable pulse trains 20 and 30 as shown in FIG. 3, in which a pulse of voltage $+V$ is applied to contact *2a* and a similar pulse of voltage $-V$ is applied to contact *3a*. A pulse $+V_p$ is now applied to contact 2a and momentarily increases the total applied voltage above the threshold voltage $V_T$. The current path 2a–3a, which previously was in a high impedance condition and passing only a small current $I_1$, now switches to a low impedance condition at time $t_1$ and passes a large current $I_2$ at the maintained bias voltage 2 v. After a short interval another pulse train 40 applies a pulse of voltage +V to contact 4a, thus raising the applied voltage between 4a and 3a to the value 2 v. Normally the current path 3a–4a would remain in the high impedance condition, but the previously established low impedance condition and consequent high current flow between contacts 2a and 3a exert a switching influence on the adjoining current path 3a–4a and the latter immediately adopts a low impedance condition at time $t_2$. Shortly after this the pulse train 20 falls to zero voltage, i.e. below the critical voltage $V_c$ and the current path 2a–3a can no longer maintain a low impedance condition and reverts to a high impedance at time $t_3$. Next, pulse train 50 applies a negative voltage −V to contact 5a, and as a result the current path 4a–5a becomes a low impedance path at time $t_4$, after which the voltage −V is removed from contact 3a and the path 3a–4a reverts to a high impedance condition at time $t_5$.

In due course pulse train 20 raises contact 2b to voltage +V and causes the current path 5a–2b to switch to a low impedance at time $t_6$, and so the initial digit represented by the pulse $V_p$ is propagated through the gallium arsenide as a succession of low impedance current paths under the control of the four clock pulse trains 20, 30, 40 and 50.

In practice the contacts of each series 2, 3, 4 and 5 must be decoupled from the other contacts in that series, and therefore each contact is connected to its pulse train source by an impedance.

Figure 4:
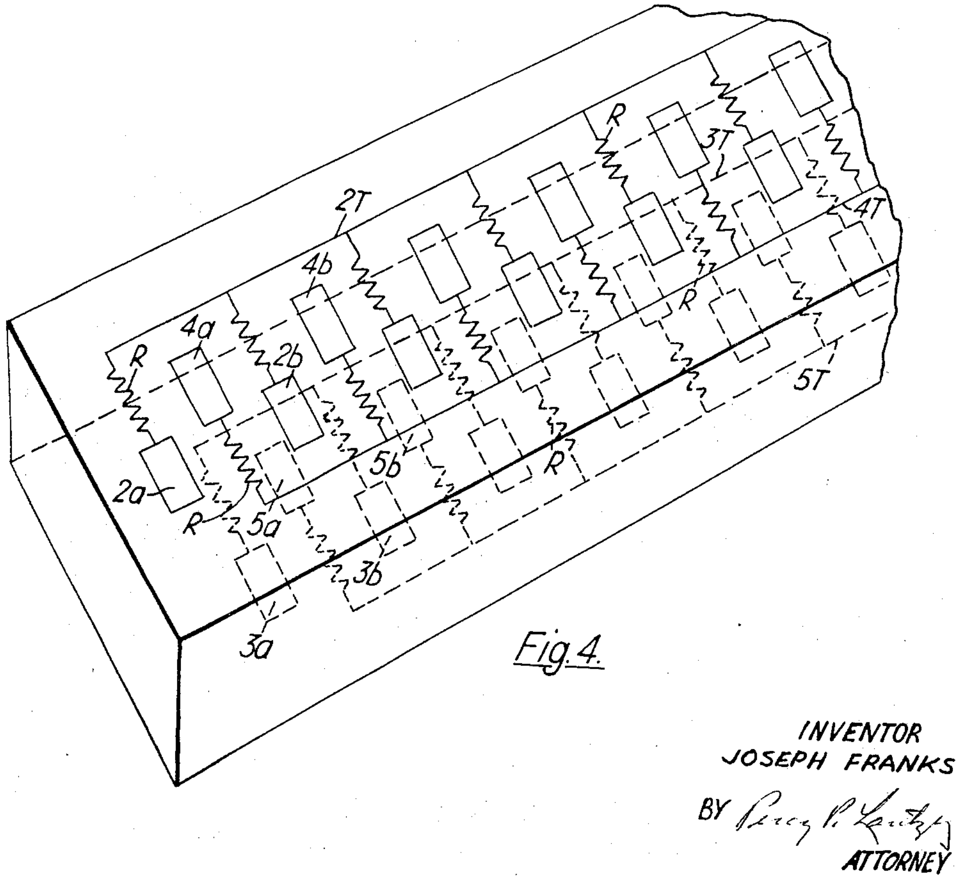
FIG. 4 is a diagrammatic perspective view of the arrangement for a digital shift register.

In the perspective view shown in FIG. 4 the contacts 2a, 2b, 2c etc. are shown interlaced with contacts 4a, 4b etc. Each contact 2a, 2b etc. is connected by an individual impedance R to a common terminal 2T to which the pulse train 20 is applied. Similarly pulse train 40 is applied to contacts 4a, 4b etc. by the terminal 4T and individual impedances R. Pulse trains 30 and 50 are applied via terminals 3T and 5T and impedances R to contacts 3a, 3b etc. and 4a, 4b etc.

Figure 5:
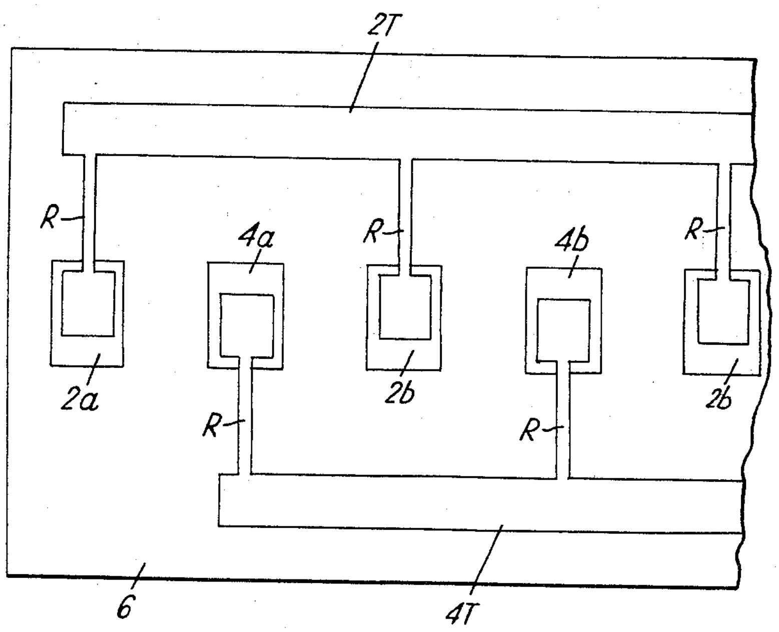
FIG. 5 is a plan view illustrating the layout of a thin film interdigital contact pattern for the shift register.

In a preferred embodiment of the arrangement shown in FIG. 4 both the contacts and the impedances and terminals are thin film patterns on the gallium arsenide. As illustrated in FIG. 5 a number of thin film gold contacts 2a, 2b, 2c, 4a and 4b are deposited on the face of the gallium arsenide substrate. The gold is evaporated in a vacuum and the gallium arsenide substrate is suitably masked to allow the thin film to form on the substrate only in the injection areas. An insulating thin film 6 is then deposited on the remaining area of the face around the gold contacts leaving them uncovered. Finally two chrome-nickel patterns comprising the impedances R and terminals 2T and 4T are evaporated onto the insulating layer. Each resistance R has its value determined by the length, width and thickness of the chrome-nickel film. Each resistance R is terminated at one end by a large area contact overlapping its associated gold film 2a, 4a etc. and at the other end by joining up with the large area terminal strip 2T or 4T. The aluminium contacts and associated circuitry are formed on the opposite face in a similar way.

In a typical example of a shift register having thin film patterns as shown in FIG. 5 the gold and aluminium contacts are approximately 500 to 1000 Angstroms thick. The gold and aluminium injecting contacts are 0.5 mm. wide by 1 mm. long and the gallium arsenide slice is 0.1 mm. thick. Resistivity of the gallium arsenide is about $10^8$ ohms-cm.

Figure 6:
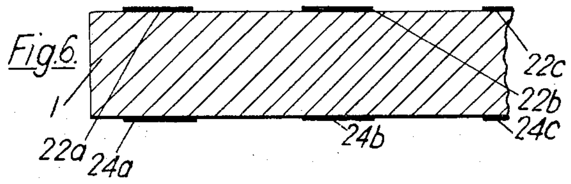
FIG. 6 is a cross-sectional view of a layer of gallium arsenide with a pattern of injection contacts on each face for the digital store.
Figure 8:
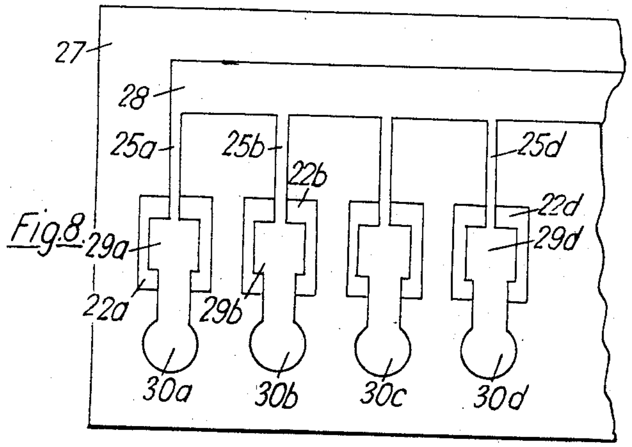
FIG. 8 is a plan view of one of the contact patterns on one face of the arrangement shown in FIG. 6.

The arrangement shown in FIGS. 6 and 8 comprises a slice 1 of a high resistivity gallium arsenide bearing on one face of a series of gold contacts 22a, 22b, etc.

and on the opposite face a series of aluminium contacts 24a, 24b, etc. Similarly as with the discussion of FIG. 1 is a bias voltage 2 v. is applied across the contacts 22a–24a, the current $I_1$ flowing between them in the gallium arsenide is very small, as shown in FIG. 2. If now a pulse $V_p$ is applied so that the applied voltage exceeds the threshold voltage $Vt$ a negative resistance effect occurs, the current path assumes a low impedance condition and when the pulse is ended a large current $I_2$ flows at the maintained bias voltage 2 v.

Figure 7:
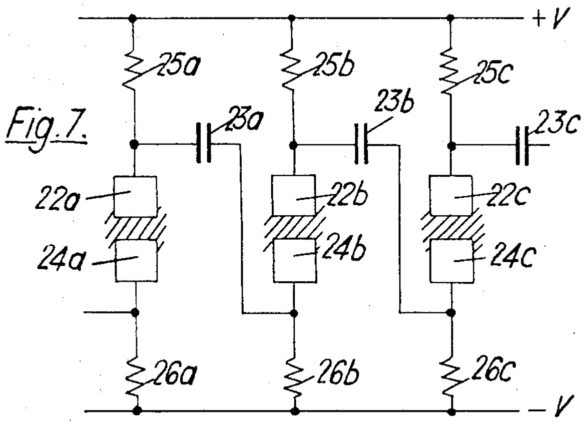
FIG. 7 is a diagrammatic circuit of a digital pulse store.

To complete the pulse store arrangement each gold contact 22a, 22b of a gold/aluminium pair is coupled by a capacitor 23a, 23b etc. to the aluminium contact 24b, 24c, respectively of the next pair, as shown in FIG. 7. When the negative going pulse $V_p$ is applied to contact 24a, and the current path 22a–24a switches to a low impedance condition, capacitor 23a discharges. The effect of this is to transfer the pulse $V_p$ to contact 24b and so cause current path 22a–23a to switch to a low impedance condition, thereby discharging capacitor 23b, and so on. Once capacitor 23a is discharged, and current path 22b–24b has switched, the potential across contacts 22a–24a drops below the critical hold-on voltage $V_c$ and that stage reverts to a high impedance condition. Thus the initial pulse $V_p$ is transferred from stage to stage at a velocity determined by the circuit parameters, i.e. the values of the capacitances 23a, 23b etc., the resistances 25a, 25b, 26a, 26b etc., and the switching speed of the gallium arsenide current paths. The rate of transfer is entirely independent of any clock pulse trains since the store only requires D.C. bias supplies.

The gold and aluminium contacts are deposited as thin films, evaporated in vacuo onto the faces of the gallium arsenide substrate. As shown in FIG. 8 the gold contacts 22a, 22b etc. are deposited in a row on the face of the slice 1. The remainder of the face is covered by an insulating thin film 27 and then a chrome-nickel thin film pattern is formed. This pattern provides the main bias voltage terminal 28, the individual resistances 25a, 25b, etc., connections 29a, 29b etc. to the gold contacts 22a, 22b and individual terminals 30a, 30b, etc. to which the coupling capacitors 23a, 23b (not shown) are later connected.

In a typical construction the gold and aluminium thin films are between 500 and 1000 Angstroms in thickness and the substrate is about 0.1 mm. thick. The contacts are each 0.5 mm. wide by 1 mm. long. Resistivity of the gallium arsenide is about $10^8$ ohms-cm. The thickness and side of the chrome-nickel pattern, particularly the strips 25a, 25b, depend on the specific resistivity required.

Since in the arrangement described above the gold and aluminium contacts are on separate faces, this involves a capacitor connected between a contact on one face and a contact on another face for each stage.

Figure 9:
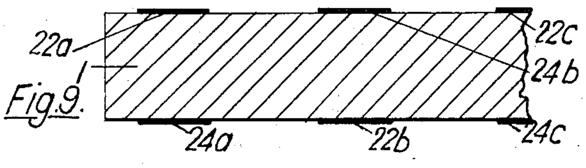
FIG. 9 is a cross-sectional view of an alternative arrangement to FIG. 6.
Figure 10:
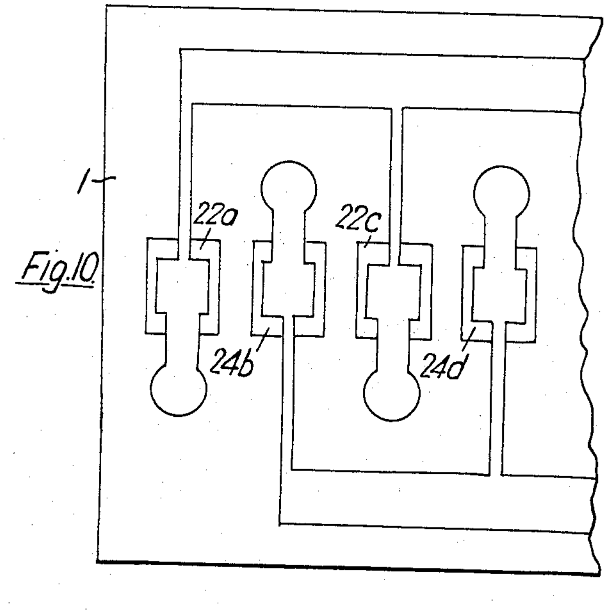
FIG. 10 is a plan view of a contact pattern on one face of the arrangement shown in FIG. 9.

An alternative arrangement in which each face has two sets of contacts, one gold and one aluminium, is illustrated in FIGS. 9 and 10. The thin film construction techniques are the same as before, but now one face of the substrate carries half the gold contacts 22a, 22c etc., in an interdigital arrangement with half the aluminium contacts 24b, 24d etc. The other face carries the remaining contacts 22b, 22d and 24a, etc. in a similar manner of disposition. All the gold contacts on both faces are connected to one side of the bias voltage source and all the aluminium contacts to the other side. The capacitances can now be connected between pairs of contacts on the same face, i.e. 22a–24b, 22b–24c, 22c–24d and so on.

The coupling capacitors 23a, 23b etc., may themselves be thin film capacitor patterns deposited on the insulated gallium arsenide body. This feature is particularly applicable to the construction of FIGS. 9 and 10.

It is to be understood that the foregoing description of specific examples of this invention is not to be considered as a limitation on its scope.

I claim:

1. A semiconductor device for transferring an electrical pulse from one end of said semiconductor to the other in successive stages comprising a body of semiconductor material having means for exhibiting cumulative negative resistance effects upon discrete injection of carriers thereto, two similar series of spaced injection contacts for respective hole and electron injection disposed on opposite faces of said body, a series of similar impedances for each series of contacts with each contact connected to one of the impedances, a common electric terminal for each respective series of contacts connected to the impedance of the respective series thereof, and the connections, impedances and terminals being insulated from the semiconductor body.

2. A semiconductor device according to claim 1 in which said series of spaced injection contacts are arranged in an interdigital pattern, the interdigital contact patterns on the two opposing faces being axially aligned with individual contacts of each pattern being opposite spaces in the opposite pattern, the contacts on one face being hole injecting contacts and the contacts on the other face being electron injecting contacts and the injection contacts being metal thin films deposited on each face.

3. A semiconductor device according to claim 1 in which the hole injecting contacts are gold.

4. A semiconductor device according to claim 1 in which the electron injecting contacts are aluminium.

5. A semiconductor device according to claim 1 in which the layer of semiconductor material is semi-insulating gallium arsenide.

6. A semiconductor device according to claim 1 in which the connections, impedances and terminals for each interdigital pattern are chrome-nickel thin films.

7. A semiconductor device according to claim 6 in which the chrome-nickel thin films are deposited over an insulating thin film on the semiconductor surface, with only the connection portions of each pattern making contact with the appropriate injection contacts.

8. A semiconductor device according to claim 1 in which the contacts of the two series are connected in successive pairs by similar capacitances and the two series of contacts are arranged in axial alignment on opposite faces respectively of the semiconductor layer, the contacts of one series being opposite the contacts of the other series.

9. A semiconductor device according to claim 1 in which each face of the semiconductor layer is provided with two series of contacts of hole and electron injecting types respectively which are arranged in an interdigital pattern, the interdigital patterns on the two opposing faces being axially aligned, the hole injecting contacts of one pattern being placed opposite the electron injecting contacts of the other pattern.

10. A semiconductor device according to claim 8 in which the coupling capacitors are thin film capacitors.

References Cited

UNITED STATES PATENTS

| | | | |
|---|---|---|---|
| 2,922,898 | 1/1960 | Henisch | 317—235.22 |
| 3,038,085 | 6/1962 | Wallmark et al. | 317—235.22 |
| 3,070,711 | 12/1962 | Marcus et al. | 317—235.22 |

JAMES D. KALLAM, *Primary Examiner.*